UNITED STATES PATENT OFFICE.

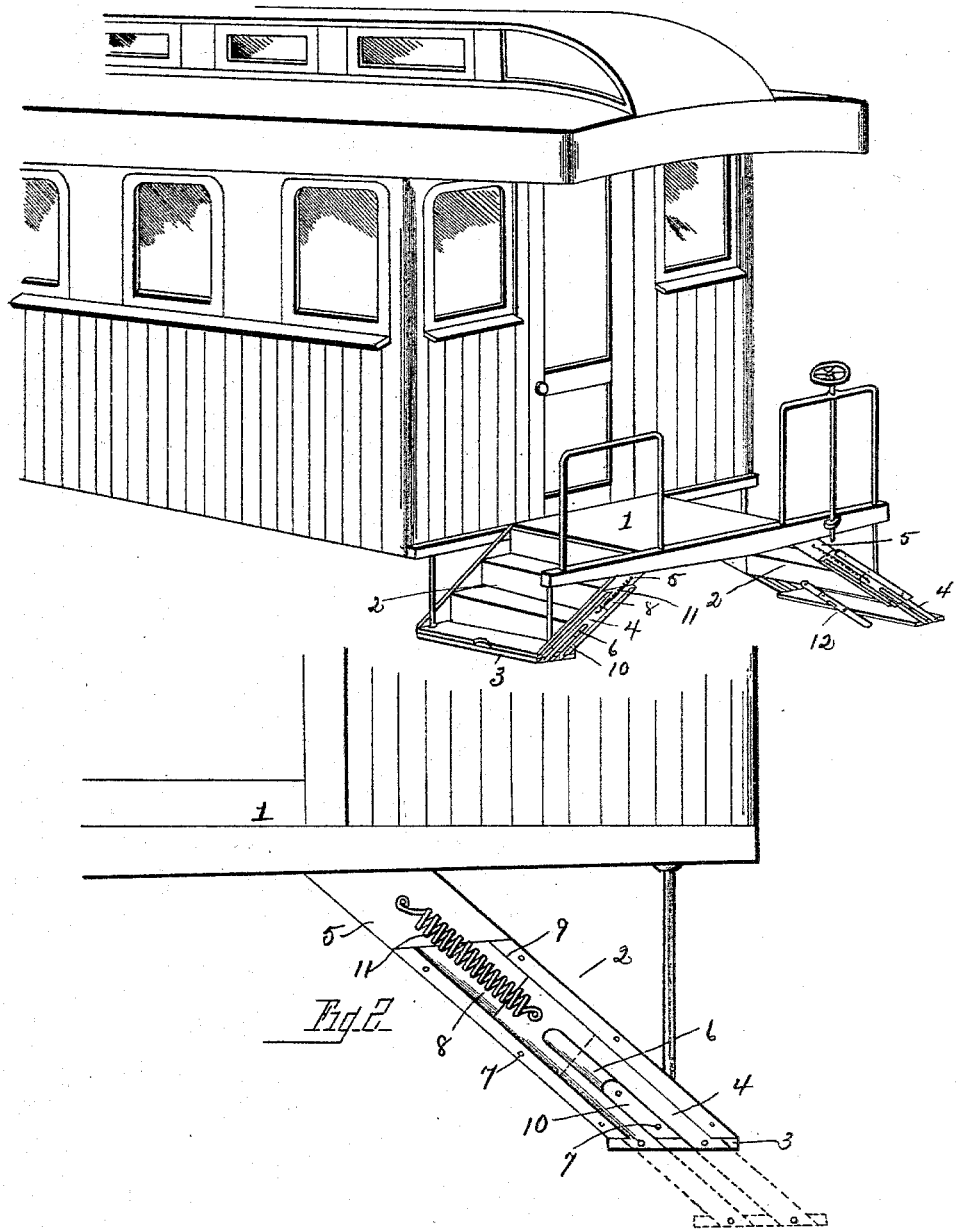

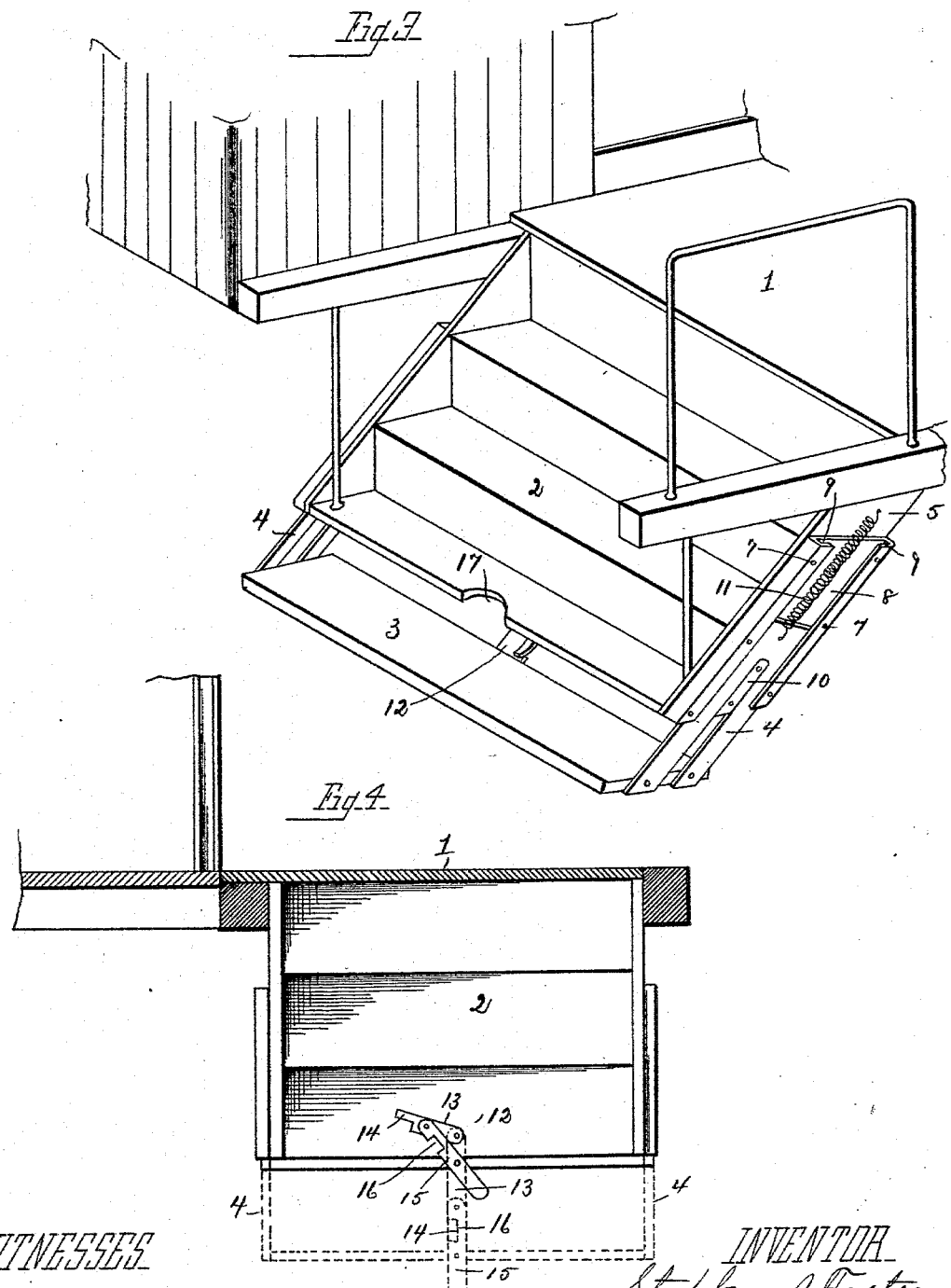

STEPHEN A. FOSTER, OF TOLEDO, OHIO, ASSIGNOR OF ONE-HALF TO ORSON B. CLARK, OF SAME PLACE.

EXTENSIBLE CAR-STEP.

SPECIFICATION forming part of Letters Patent No. 494,949, dated April 4, 1893.

Application filed October 11, 1892. Serial No. 448,490. (No model.)

*To all whom it may concern:*

Be it known that I, STEPHEN A. FOSTER, of Toledo, county of Lucas, and State of Ohio, have invented certain new and useful Improvements in an Automatically-Extensible Car-Step; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an automatically adjustable car step, and has for its object to provide a step supplemental to the ordinary fixed steps that shall be capable of being automatically extended to within convenient distance of the platform, to allow of access to the car without the use of stools, and capable of being automatically folded beneath the fixed car steps.

A further object is to provide a supplemental step of this character that is adapted to steps of cars in present use without requiring a change in the construction.

A further object is simplicity, convenience in operation, and a minimum expense.

The invention consists in the parts and combination of parts hereinafter described and pointed out in the claims.

In the drawings: Figure 1 is an elevation of the end of a car showing upon the side nearest the observer the ordinary car step, with my supplemental step secured thereto in folded position, and upon the opposite side the step extended. Fig. 2 is a side view of the ordinary step with the supplemental step extended. Fig. 3 is a perspective view of a car step, showing the supplemental step extended. Fig. 4 is a rear view of the fixed car steps, showing the supplemental step in full lines as folded with the catch disengaged, and in dotted lines as extended, and the catch in engagement.

1 designates the platform of the car, 2 the ordinary fixed car step, which as is well known is built at a height to obviate the possibility of contacting with any obstructions at stations or tracks, and consequently at a distance from the usual platform, to render it inconvenient of access without the portable box or step to be supplied by the porter or brakeman.

While the portable step may be placed in position at terminal points or at stations where there is a prolonged stop; this provision is omitted at stations where there is but a short stop, and at best, there is danger of the box or step overturning by reason of a passenger in departing from or entering a car stepping upon one side thereof.

The object of my invention is to provide a supplemental extensible step firmly secured to the fixed car step, which can be automatically extended or folded by a simple act of the brakeman or porter even while both hands are occupied with baggage or children while alighting or departing from the car, and consists in a step 3 of the full width of the car steps, upon each end of which are secured metal slides 4 of nearly the width of the side rails 5, having a longitudinal slot 6 extending to near the upper end.

Secured firmly to the side rails by bolts or nuts 7 is a metal plate 8 preferably of the same width of the side rails, and provided with ways 9 into which slides 4 telescope, there being a stop 10 cast integral with and centrally of the plate which may be perforated to receive bolts or rivets 7, which enter the rail to assist in securing the plate. Stop 10 is of a size and position on the plate to allow the slot of the slide to enter the same, and limit the movement to a vertical adjustment equal to the height of the riser of the fixed step in either direction.

11 designates coiled springs secured at the upper end to the plate, and at the lower end to the upper end of the slide, with sufficient resiliency to allow the slide to descend until the metal at the end of the slot contacts with the stop, and a tension to draw the supplemental step firmly beneath the lower fixed step.

12 designates a catch, comprising two metal bars, the upper bar 13 being pivotally secured to the rear edge of the lower fixed step and having the same downward inclination of the side rails, with a free end 14, of but one half the width of the bar, and a bar 15 centrally pivoted to the inner edge of the supplemental step and having the same inclination of the side rails, with a recess 16 formed in the body thereof above the pivot, the inner end of the bar being pivotally secured to the bar 13 back of the reduced end 14, whereby when the supplemental step is extended the bars are brought in an inclined vertical alignment and the end 14 enters recess 16 and locks the step in position against the tension of springs 11.

In order to unlock the catch, the brakeman or porter presses upon the outer end of bar 15, breaking joint with the catch, and the springs exerting a pull upon the slides and supplemental step, the end 14 of bar 13 is released from the recess 16 of the bar 15 and the catch is folded as shown in full lines Fig. 3, thereby allowing the springs to draw the supplemental step closely beneath the lower fixed step out of the way of contact with any fixed object.

In order to automatically extend the step, the lower fixed step is cut out slightly as at 17, whereby the brakeman or porter may extend the supplemental step by merely placing the heel of his shoe in the recess and bearing upon the same, thereby leaving both hands free.

While I have shown and described a particular form of spring and catch, I wish it understood that this is only diagrammatic of a preferred form, and that I may vary these constructions widely without departing from the spirit of my invention.

It will be seen that my improvement may be attached to any form of step in present use without affecting the construction in the least.

What I claim is—

1. The combination with the fixed steps, the lower one of which is cut away, at the center to permit the foot to bear upon the supplemental step held beneath the lower fixed step of the inclined side slides carrying a supplemental step, springs attached to the slide for normally holding the supplemental step raised, and an automatic locking device adapted to hold the steps lowered.

2. In a car step, the combination with a fixed step, of a supplemental step, and an automatic locking device adapted to hold the supplemental step lowered, said locking device comprising the upper bar pivoted to the fixed step and having a reduced free end, and a lower bar pivoted to the supplemental step, and pivotally connected with the upper bar, said lower bar having a recess adapted to receive the reduced end of the upper bar, and lock the supplemental step when lowered.

3. In a car step of the class described, the combination with the fixed portion having side guides and stops within the guides, of the slides within the guides carrying a supplemental step, and slotted longitudinally to receive the stops, the spring attached to the slides and the fixed portion, and the locking device connecting the fixed and supplemental steps.

In testimony that I claim the foregoing as my own I hereby affix my signature in presence of two witnesses.

STEPHEN A. FOSTER.

Witnesses:
WILLIAM WEBSTER,
CARROLL J. WEBSTER.